(12) United States Patent
Liu et al.

(10) Patent No.: US 8,259,819 B2
(45) Date of Patent: Sep. 4, 2012

(54) METHOD AND APPARATUS FOR IMPROVING VIDEO QUALITY BY UTILIZING A UNIFIED LOOP FILTER

(75) Inventors: Yu Liu, Hong Kong (HK); Yan Huo, Shenzhen (CN); Ka Man Cheng, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 353 days.

(21) Appl. No.: 12/635,383

(22) Filed: Dec. 10, 2009

(65) Prior Publication Data

US 2011/0142136 A1    Jun. 16, 2011

(51) Int. Cl.
*H04N 11/02* (2006.01)
(52) U.S. Cl. .................................................. 375/240.29
(58) Field of Classification Search .............. 375/240.18
See application file for complete search history.

(56) References Cited

U.S. PATENT DOCUMENTS

| | | | |
|---|---|---|---|
| 5,825,936 A * | 10/1998 | Clarke et al. | 382/261 |
| 7,551,793 B2 * | 6/2009 | Guangxi et al. | 382/261 |
| 2009/0154567 A1 | 6/2009 | Lei et al. | |
| 2010/0142778 A1 * | 6/2010 | Zhuo et al. | 382/128 |

FOREIGN PATENT DOCUMENTS

EP         1841230 A1    10/2007

OTHER PUBLICATIONS

Y. Vatis, et al., Coding of Coefficients of Two-dimensional Non-Separable Adaptive Interpolation Filter, Visual Communications and Image Processing, Jul. 2005, Beijing, China.
Steffen Wittmann, et al., Transmission of Post-Filter Hints for Video Coding Schemes, Proceedings of 2007 IEEE International Conference on Image Processing (ICIP2007).
Peter List, et al., Adaptive Deblocking Filter, IEEE transaction on CSVT, Jul. 2003, p. 614-619, vol. 13, No. 7.
C. Tomasi, et al., Bilateral Filtering for Gray and Color Images, Proceedings of the 1998 IEEE International Conference on Computer Vision, Bombay, India.
A.C. Bovik, et al., A Generalization of Median Filtering Using Linear Combinations of Order Statistics, IEEE Trans. on ASSP, Dec. 1983, p. 1342-1350, vol. 31, No. 6.

(Continued)

*Primary Examiner* — David Czekaj
*Assistant Examiner* — Leron Beck
(74) *Attorney, Agent, or Firm* — Ella Cheong Hong Kong; Margaret A. Burke; Sam T. Yip

(57) ABSTRACT

The present invention relates to method and apparatus for improving video quality. The present invention provides a unified loop filter including: a pixel determining unit which determines the type of a pixel based on boundary strength; a similarity transforming unit which transforms a nonlinear filter into a nonlinear similarity-ordered statistics filter; and an integrating unit which integrates the nonlinear similarity-ordered statistics filter with a linear image filtering portion. The unified loop filter is applicable to filter reconstructed frames when an encoder or a decoder is processing a video signal.

17 Claims, 7 Drawing Sheets

OTHER PUBLICATIONS

Mark A. Robertson, et al., DCT Quantization Noise in Compressed Images, IEEE Trans. on CSVT, Jan. 2005, p. 27-38, vol. 15, No. 1.

Takeshi Chujoh, et al., Quadtree-based adaptive loop filter, Study Group 16—Contribution 181, Jan. 2009, COM 16—C 181—E, International Telecommunication Union.

Yi-Jen Chiu, et al., Adaptive (Wiener) Filter for Video Compression, VCEG 35th Meeting, Jul. 16-18, 2008, Q.6/SG16, VCEG-AI14, International Telecommunication Union.

Takeshi Chujoh, et al., Block-based Adaptive Loop Filter, Video Coding Experts Group 35th Meeting, Jul. 16-18, 2008, Q.6/SG16, VCEG-AI18, International Telecommunication Union.

Takeshi Chujoh, et al., Improvement of Block-based Adaptive Loop Filter, VCEG 36th Meeting, Oct. 8-10, 2008, Q.6/SG16, VCEG-AJ13, International Telecommunication Union.

Takeshi Chujoh, et al., Specification and experimental results of Quadtree-based Adaptive Loop Filter, VCEG 37th Meeting, Oct. 15-18, 2009, Q.6/SG16, VCEG-AK22 (r1), ITU.

* cited by examiner

METHOD AND APPARATUS FOR IMPROVING VIDEO QUALITY BY UTILIZING A UNIFIED LOOP FILTER

TECHNICAL FIELD

The present application relates generally to digital video processing. In particular, the present application relates to digital video coding including encoding and decoding.

BACKGROUND

Digital video coding involves various processes such as, but not limited to, transform, quantization, motion estimation, in-loop deblocking filtering and entropy coding on the residue of the motion compensated or the intra interpolated block. These processes are implemented with respective devices. To achieve better coding efficiency, the block-based DPCM (Differential Pulse Code Modulation) technique is applied to these processes in video standards such as H.264/AVC.

Image quality in digital video is measured by subjective quality and objective quality. Subjective quality is measured by how a viewer perceives the image and the viewer can tell which video has a better image quality by comparing the artifacts that the viewer finds in the video. Using the block-based DPCM technique, blocking artifacts are introduced into a video image and need to be alleviated. The process of alleviating blocking artifacts is generally known to be deblocking. In a block-based technique, video pixels are encoded block-by-block through video compression. These blocks are inverse transformed and decoded to reconstruct the image.

Objective quality is measured by parameters such as Power Signal to Noise Ratio (PSNR). The more noise exists in a video image, the lower the PSNR and less desirable it will be. There are various types of noise such as Gaussian noise, quantization noise and it is desirable to suppress the noise.

To improve the subjective quality, an in-loop deblocking filter is designed to alleviate blocking artifacts in the video coding standard H.264/AVC. One way to design such an in-loop deblocking filter is to use a bank of predefined low-pass filters. The low-pass filters are described in List, P.; Joch, A.; Lainema, J.; Bjontegaard, G.; Karczewicz, M., *Adaptive Deblocking Filter*, IEEE Trans. CSVT, Vol. 13, No. 7, 2003. The low-pass filters assume the smooth image model and are capable of denoising blocking artifacts. But, a smooth image model is not always applicable. A video image may contain many singularities, such as edges, textures, etc., and the low-pass filters are incapable of handling these singularities properly as the low-pass filters smooth both blocking artifacts and these singularities.

Another way to design such an in-loop deblocking filter is to use a nonlinear bilateral filter. A nonlinear bilateral filter is described in C. Tomasi. R. Manduchi, *Bilateral filtering for gray and color images*, Proceedings of IEEE Int. Conf. Computer Vision, 1998 and is designed to address the limitation of low-pass filters in handling singularities because the nonlinear bilateral filter is effective in denoising both blocking and ringing artifacts while retaining the sharpness of singularities such as edges. However, both low-pass filters and nonlinear bilateral filters are not frequency-selective and are incapable of optimally suppressing Gaussian noise.

To improve objective quality, a Wiener filter is used to suppress Gaussian noise, blurring and distortion in a video. A Wiener filter also provides further applications such as improving the coding efficiency of the video coding standard H.264/AVC by determining interpolation filter coefficients at the half-pixel level or quarter-pixel level in motion estimation or motion compensation modules to achieve better image prediction. However, a Weiner filter is incapable of alleviating the blocking artifacts and fails to improve the subjective image quality.

There is a need in the art for an in-loop filter which optimizes both subjective quality and objective quality.

SUMMARY OF THE INVENTION

The present invention is effective not only in removing the blocking and ringing artifacts to improve the subjective quality but also in achieving gains in power-signal-to-noise ratio (PSNR) to improve the objective quality while providing bitrate reduction to retain coding efficiency. The present invention is applicable to various coding schemes and coding structures such as IPPP, IBBP and hierarchical B.

The present invention is capable of taking into account of the different characteristics in different regions in each video frames to further improve the image quality. To achieve this further improvement, the present invention determining the type of a pixel in each frame by classifying it as either an enhancement pixel or a restoration pixel. Whether a pixel is an enhancement pixel or a restoration pixel is determined according to the context characteristics such as boundary strength. To enhance the efficiency of such classification, an embodiment of the present invention uses block-based pixel classification rather than sample-level pixel classification to reduce the computational complexity. Using block-based pixel classification also allows an enhancement in the coding performance so that a lower bitrate is required.

The present invention incorporates both linear image filtering and nonlinear image filtering to improve the image quality in both objective and subjective aspects. By incorporating both linear image filtering and nonlinear image filtering, the present invention takes into consideration of not only the photometric similarity of pixel samples but also the geometric closeness or spatially ordered statistics.

The present invention uses a similarity function to transform a nonlinear filter into a nonlinear similarity-ordered statistics filter to take into account photometric similarity. Furthermore, the present invention integrates a linear filter such as an adaptive Wiener filter with the nonlinear similarity-ordered statistics filter which by concatenating the linear filter with the nonlinear similarity-ordered statistics filter to handle the geometric closeness or spatially ordered statistics.

The present invention adapts to the presence of singularities to better preserve edges by determining the optimal weight vector to minimize a cost function. The unified loop filter is optimized by using a least mean square error (LMSE) criterion between the reconstructed frame and the original frame, and is adaptive to each frame. The unified loop filter is also adaptive to different type of pixels by selecting different filter characteristics according to the pixel classification results. The filter characteristics such as filter tap type and filter tap length are selected based on rate distortion optimization to minimize the distortion between the filtered image and the original image. To further enhance the coding efficiency, symmetry of the filter is exploited. The filter side information such as filter tap type and filter coefficient quantization bits are encoded before transmitting to the decoder side.

The unified loop filter is applicable in any hybrid video coding system, such as H.264/AVC JM/KTA or AVS and the unified loop filter can replace the deblocking loop filter in a conventional video codec.

Other aspects of the present invention are also disclosed as illustrated by the following embodiments.

BRIEF DESCRIPTION OF THE DRAWINGS

These and other objects, aspects and embodiments of this claimed invention will be described hereinafter in more details with reference to the following drawings, in which:

DETAILED DESCRIPTION OF THE INVENTION

Figure 1:
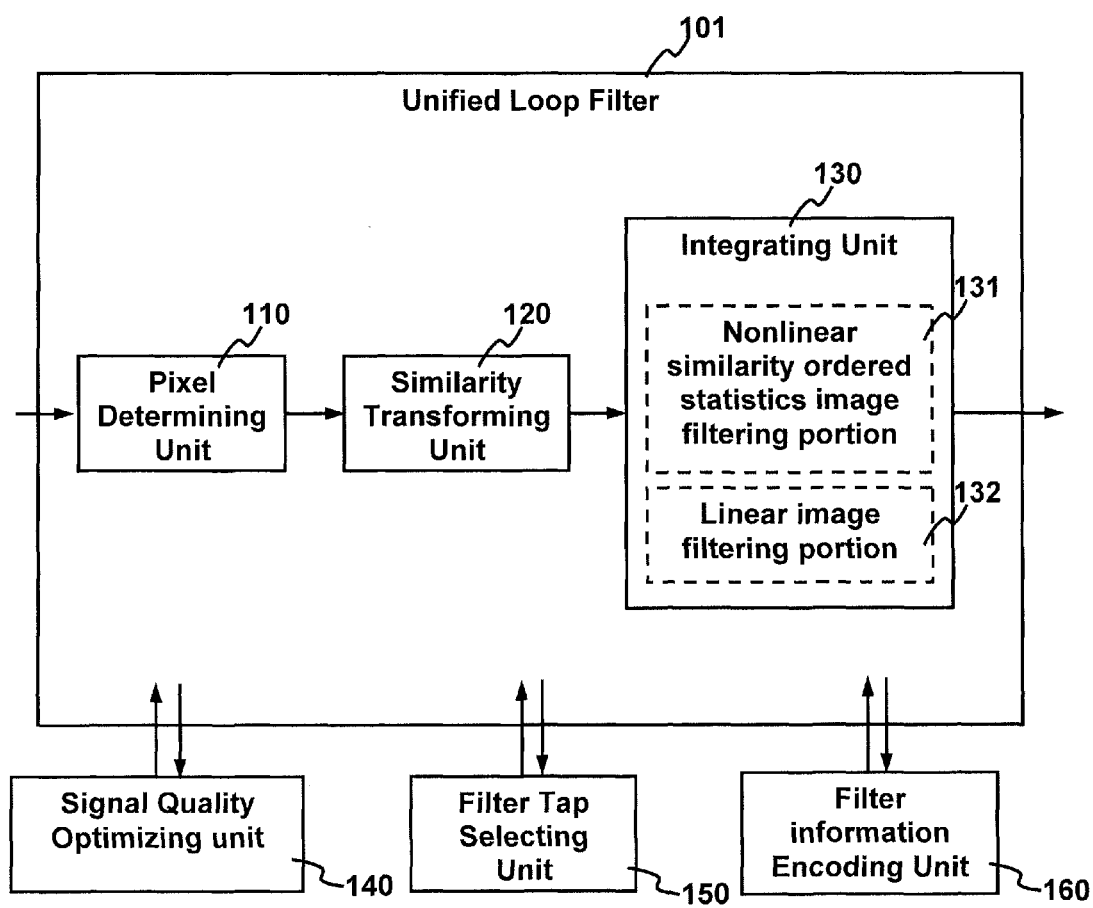
FIG. 1 shows an exemplary embodiment of a unified loop filter.

FIG. 1 shows an exemplary embodiment of a unified loop filter according to the present invention. The unified loop filter processes an incoming signal for high performance video coding. The unified loop filter includes a pixel determining unit 110, a similarity transforming unit 120, and an integrating unit 130.

The pixel determining unit 110 is to determine the type of a pixel based on context characteristics of the pixel to be filtered. The type of a pixel is determined such that the pixel with higher quantization error can be identified and processed differently. Pixels with high quantization error are likely to be those which are near to block boundaries or at block corners. For example, the pixels may be classified into two types: enhancement pixels and restoration pixels. The enhancement pixels are boundary pixels with blocking artifacts. The restoration pixels are pixels which are not enhancement pixels. The type of pixel is determined based on the context characteristics of the pixel, for example, the boundary strength (BS). In other words, the pixels around block boundaries with blocking artifacts are classified into enhancement pixels.

Figure 2:
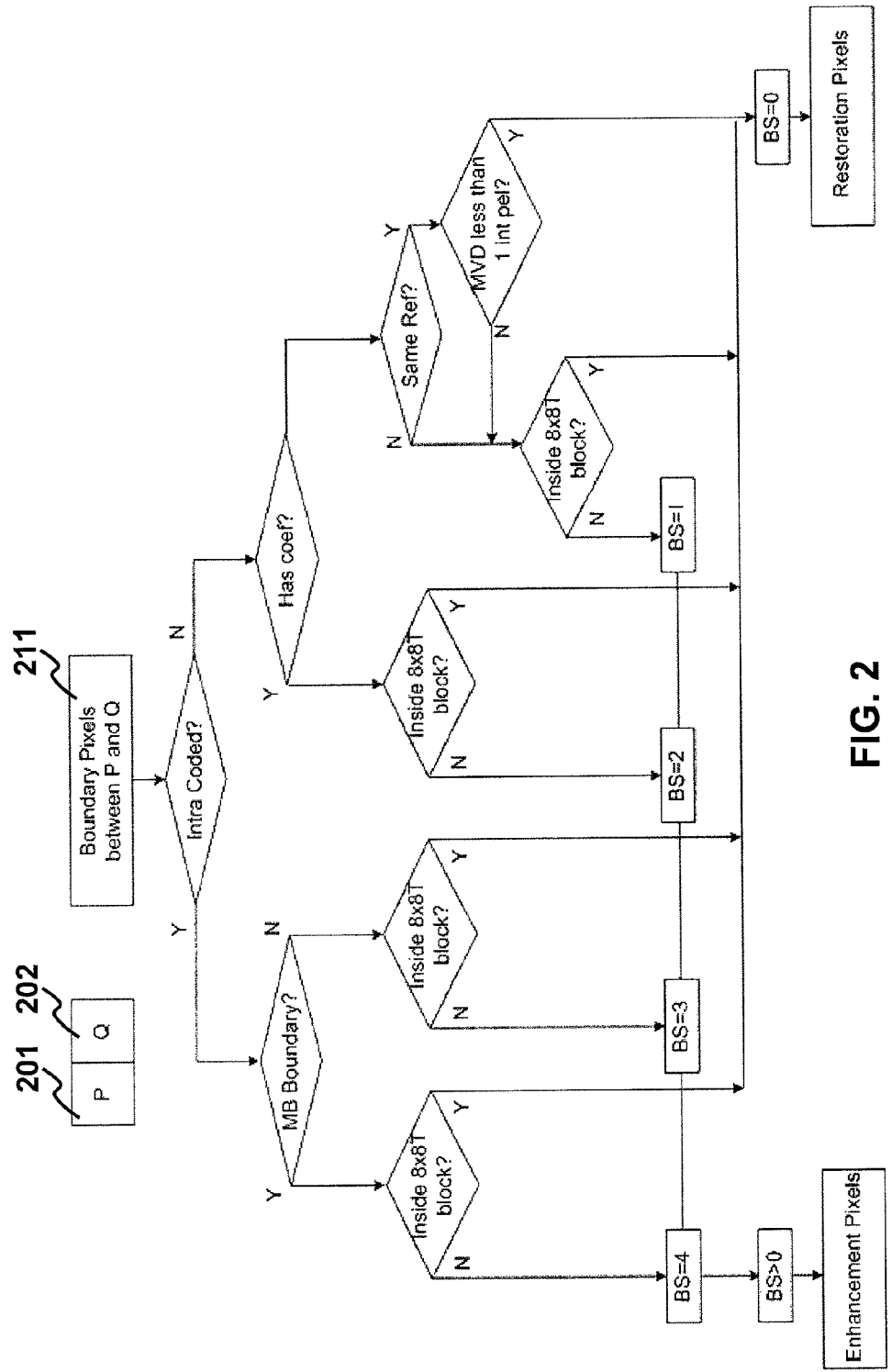
FIG. 2 shows a flowchart of an exemplary embodiment for how to determine whether a pixel is an enhancement pixel or a restoration pixel.

FIG. 2 shows a flowchart of an exemplary embodiment for determining whether a pixel is an enhancement pixel or a restoration pixel for the H.264/AVC coding standard. To determine whether a pixel is an enhancement pixel or a restoration pixel, there are a number of classification methods such as block-level pixel classification and sample-level pixel classification. In an embodiment, the block-level pixel classification is used to reduce the computational complexity. As an illustration, two blocks are taken as an example which are neighboring blocks in an image. The two blocks are: block P 201 and block Q 202. Since enhancement pixels are defined as the boundary pixels, only boundary pixels between block P 201 and block Q 202 are taken into consideration by a selecting step 211 for the whole determining process. The boundary strength (BS) between block P 201 and block Q 202 is determined by using the flowchart in FIG. 2. The details concerning determination of the boundary strength (BS) are described in Lou, J.; Jagmohan, A.; He, D; Lu, L.; Sun, M. T, H264 *Deblocking Speedup*, IEEE Trans. CSVT, Vol. 19, No. 8, 2009, the disclosure of which is incorporated herein by reference. If the boundary strength (BS) between block P 201 and block Q 202 is greater than 0, then the pixels around block boundary are classified as enhancement pixels; otherwise, those block boundary pixels as well as internal block pixels are classified as restoration pixels. While this technique is exemplary, it is understood that any technique which accurately determines boundary strength may be used in the present invention.

After it is determined whether a pixel is an enhancement pixel or a restoration pixel, a pixel classification map is obtained and provided to the unified loop filter 101 for further processing by the pixel determining unit 110.

The similarity transformation unit is to transform a nonlinear image filtering portion (not shown) into a nonlinear similarity-ordered statistics image filtering portion 131 for filtering a reconstructed signal from the output of the encoder or decoder. The nonlinear image filtering portion is a filter which can effectively remove noise such as Gaussian noise, blocking artifacts and ringing artifacts from an image while retaining the sharpness of edges. An exemplary embodiment of the nonlinear image filtering portion is a rank-ordered statistics filter; however the present invention is not limited thereto.

The transformation of the nonlinear image filtering portion is done by the similarity transforming unit 120 by converting the nonlinear image filtering portion into a filter which enables a nonlinear filter to be combined with a linear filter. The resulting filter is a nonlinear filter and can be optimized to minimize the mean square error. An embodiment of such a filter is, but not limited to, a nonlinear similarity-ordered statistics image filtering portion 131.

The general function for a linear filter is y=WX. y is the output of the linear filter, W is the linear filter coefficients vector and X is the observation vector. Instead of the observation vector $X=(x_1, x_2, \ldots, x_M)^T$, the vector of rank-ordered statistics $X_r$ is used. The vector of rank-ordered statistics is defined as $X_r=(x_{(1)}, x_{(2)}, \ldots, x_{(M)})^T$, where the elements of $X_r$ are arranged in increasing order: $x_{(1)} \leq x_{(2)} \leq \ldots \leq x_{(M)}$. The output of rank-ordered statistics filter is $$y_r = W_r^T X_r \qquad (3)$$

where $W_r$ is the vector of M optimized filter coefficients. In an embodiment, only a small weight is given to the extreme ranks of the order statistics to enhance the robustness of the filter in the presence of singularities. This is because the singularities tend to lie in the extreme ranks of the order statistics.

However, the rank-ordered statistics information only gives limited indications of the pixel similarity. In another embodiment, in order to incorporate the photometric similarity information as the bilateral filter does, it needs to transform the observation vector X into the vector of similarity statistics $X'=(x'_1, x'_2, \ldots, x'_M)^T$. The similarity transformation is defined as $$x'_i = [1 - f(x_c, x_i)] \cdot x_c + f(x_c, x_i) \cdot x_i$$

where $f(x_c, x_i)$ is the similarity function which is to compare two samples and the similarity between the two samples increases as the difference in intensity value between them decreases. The real-value similarity functions have to satisfy the following constrains:

1. $\lim_{|a-b| \to 0} f(a,b) = 1$,

2. $\lim_{|a-b| \to \infty} f(a,b) = 0$,

3. $f(a_1, b_1) \geq f(a_2, b_2)$, if $|a_1 - b_1| \leq |a_2 - b_2|$. \qquad (4)

Examples of similarity functions include uniform functions, Gaussian functions and triangular functions. The following similarity function is used to incorporate the bilateral filter:

$$f(a,b)=1-\text{Clip}(0,1,(a-b)^2/\delta^2) \quad (5)$$

where δ is the spread parameter controlling the strength of similarity transformation, and Clip(x,y,z) is a function that clips the value of z between x and y.

After similarity transformation, the vector of similarity statistics X' is further ordered to form the vector of similarity-ordered statistics $X_s=(x'_{(1)}, x'_{(2)}, \ldots, x'_{(M)})^T$ by using the following rule:

$$|x'_{(i)}-x_c| \leq |x'_{(i+1)}-x_c| \quad (6)$$

Then the output of the similarity-ordered statistics filter becomes $$y_s = W_s^T X_s \quad (7)$$

The integrating unit 130 is to combine the nonlinear similarity-ordered statistics image filtering portion 131 with a linear image filtering portion 132. The linear image filtering portion 132 is a linear filter which is capable of coping with the pictures degraded by the Gaussian noise, blurring and distortion caused by compression. In one embodiment, the linear image filtering portion 132 is a Wiener filter. The output of the Wiener filter is given by:

$$y_l = \sum_{i=1}^{N} w_i \cdot x_i = W_l^T X \quad (8)$$

where $W_l$ is a vector of N optimized filter coefficients that are obtained by using least mean square error (LMSE) algorithm.

The nonlinear similarity-ordered statistics image filtering portion 131 is combined with a linear image filtering portion 132 which allows the nonlinear similarity-ordered statistics image filtering portion 131 to take consideration of the geometric closeness or spatially ordered statistics of the pixel samples apart from the photometric similarity. In an embodiment, the linear wiener filter of Equation 8 is concatenated with the nonlinear similarity-ordered statistics filter of Equation 7 or vice versa. The unified loop filter becomes $$y_u = W_u^T X_u \quad (8)$$

where $X_u=(x'_{(1)}, x'_{(2)}, \ldots, x'_{(M)}, X_1, X_2, \ldots X_N)^T$ and $W_u$ is a vector of M+N optimized filter coefficients.

The unified loop filter 101 is further optimized by using a signal quality optimizing unit 140 to optimize the filter performance. Optimization involves the determination of the optimal weight vector W to minimize a specific cost function. In an embodiment, mean square error is used as the cost function such that the cost function is differentiable and improves both objective and subjective quality. For the linear combination of spatially ordered and similarity-ordered statistics in the unified loop filter, the optimization is accomplished by minimizing the mean square error in the following way:

$$\tilde{W}_u = \underset{\tilde{W}_u}{\text{argmin}} E(y_u - x_o)^2 \quad (9)$$

where $x_o$ is the original video frame.

The unified loop filter 101 further comprises a filter tap selecting unit 150. Based on the pixel classification map obtained by the pixel determining unit 110, the unified loop filter 101 is optimized for various types of pixels by using the filter tap selecting unit 150.

(1) Enhancement Pixels

Figure 3A:
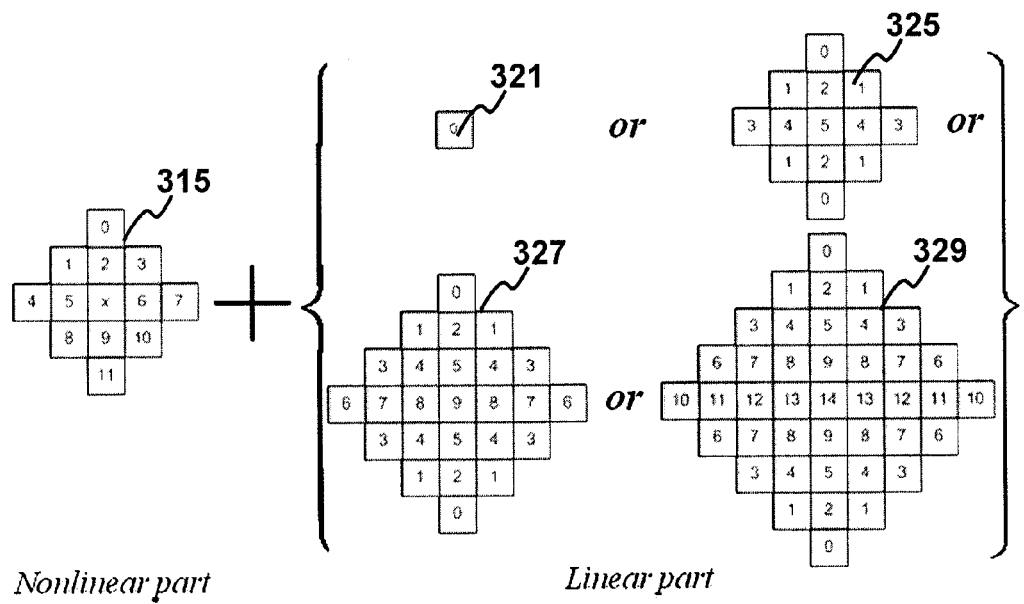
FIG. 3A shows an embodiment of filter tap configured for enhancement pixels of an image luma (Y) component.

FIG. 3A shows an embodiment of filter tap designed for enhancement pixels of an image luma (Y) component. The filter tap is configured in such a way that the deblocking enhancement is emphasized while taking restoration into consideration. In one embodiment, the nonlinear similarity-ordered statistics image filtering portion 131 is selected to be in a form such as a diamond filter which has a tap size such as five taps 315, and the linear image filtering portion 132 is selected to be in a form such as a diamond filter with quadrant symmetry which has a filter tap length such as one tap 321, five taps 325, seven taps 327, and nine taps 329.

Figure 3B:
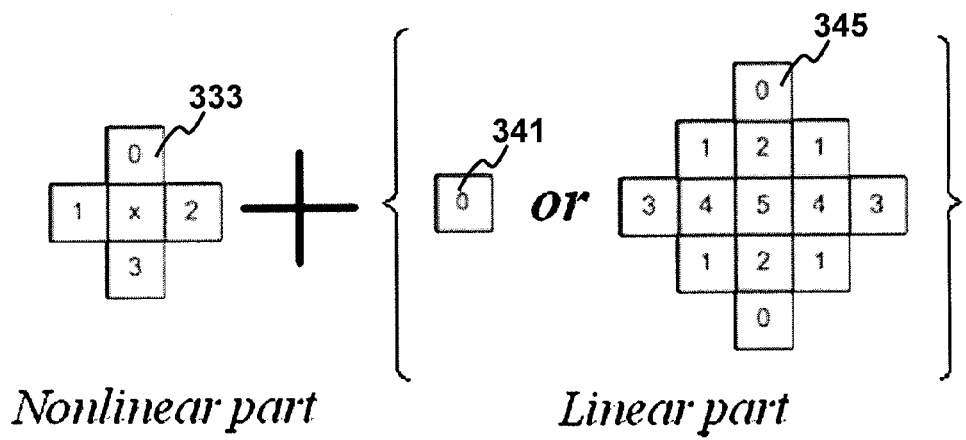
FIG. 3B shows an embodiment of filter tap configured for enhancement pixels of image chroma (Cr or Cb) components.

FIG. 3B shows an embodiment of filter tap configured for enhancement pixels of image chroma (Cr or Cb) components. In an embodiment, the nonlinear similarity-ordered statistics image filtering portion 131 is selected to be in a form such as a diamond filter which has a filter tap length such as three taps 333, and the linear image filtering portion 132 is selected to be in a form such as a diamond filter with quadrant symmetry which has filter tap length such as one tap 341 and five taps 345.

(2) Restoration Pixels

Figure 4A:
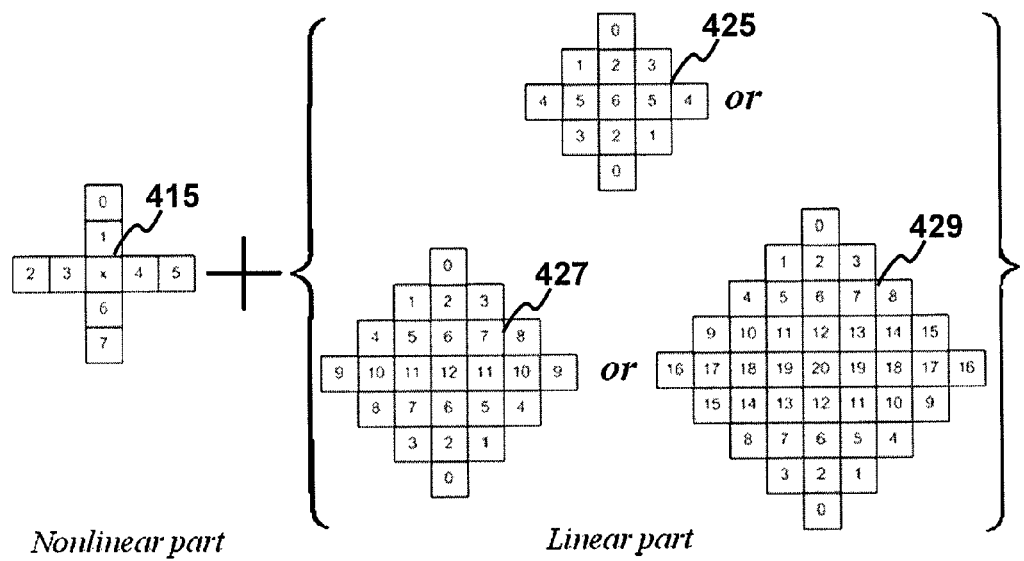
FIG. 4A shows an embodiment of filter tap configured for restoration pixels of an image luma (Y) component.

FIG. 4A shows an embodiment of filter tap configured for restoration pixels of an image luma (Y) component. The filter tap is designed in such a way that restoration is emphasized while taking deranging enhancement into consideration. In an embodiment, the nonlinear similarity-ordered statistics image filtering portion 131 is selected to be in a form such as a cross filter which has a filter tap length such as five taps 415, and the linear image filtering portion 132 is selected to be in a form such as a diamond filter with central point symmetry which has a filter tap length such as five taps 425, seven taps 427, and nine taps 429.

Figure 4B:
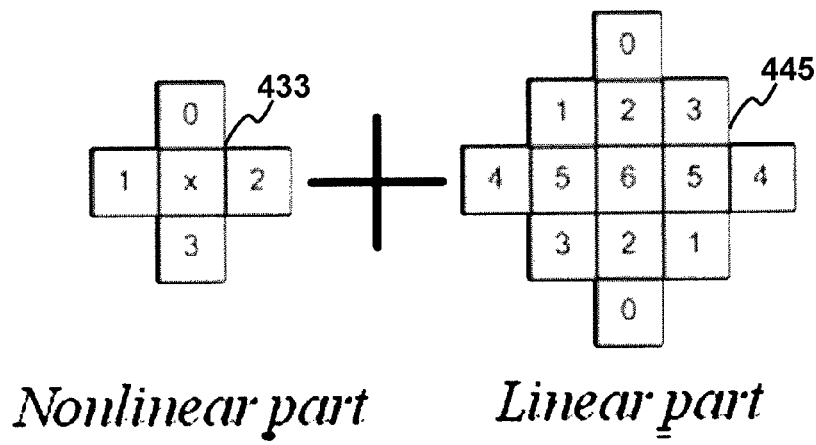
FIG. 4B shows an embodiment of filter tap configured for restoration pixels of image chroma (Cr or Cb) components.

FIG. 4B shows an embodiment of filter tap configured for restoration pixels of image chroma (Cr or Cb) components. In an embodiment, the nonlinear similarity-ordered statistics image filtering portion 131 is selected to be in a form such as a cross filter which has a filter tap length such as three taps 433, and the linear image filtering portion 132 is selected to be in a form such as a diamond filter with central point symmetry which has a filter tap length such as five taps 445.

Figure 5:
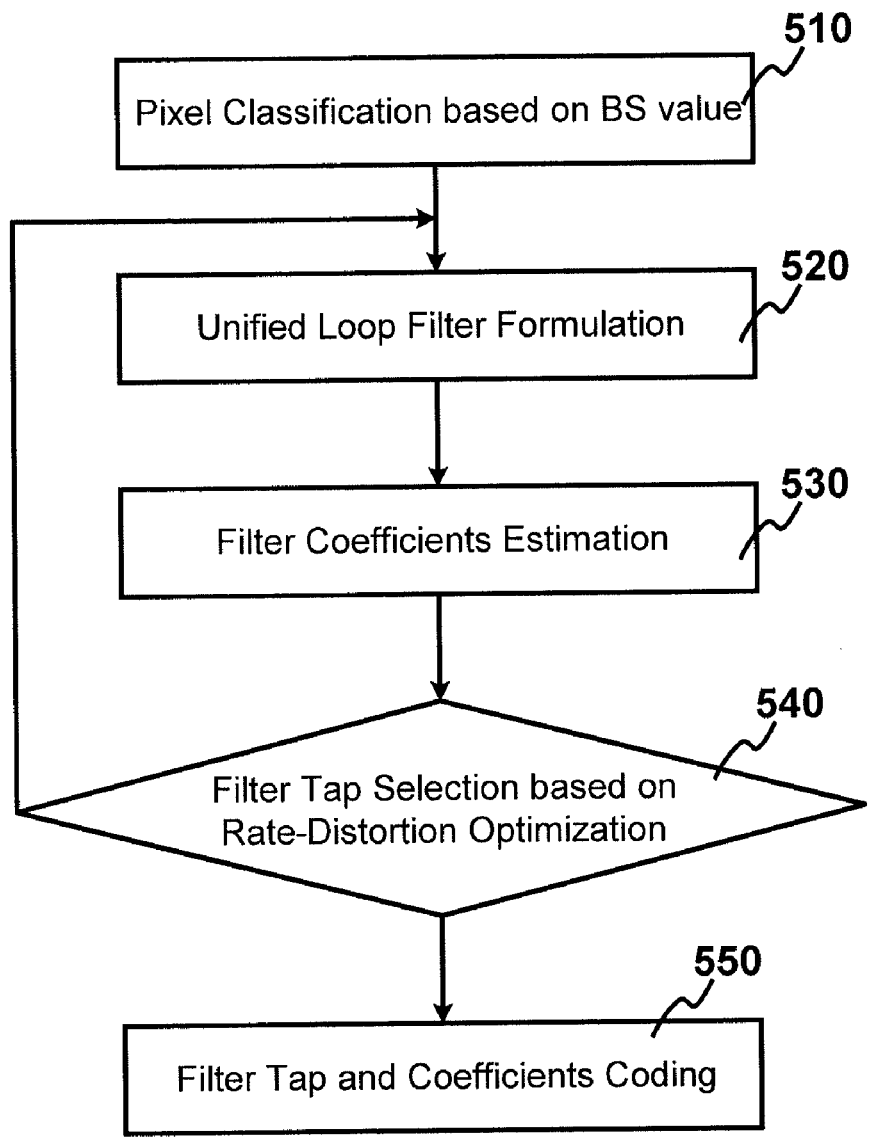
FIG. 5 shows a flowchart for a unified loop filtering process at an encoder.

FIG. 5 shows a flowchart for a unified loop filtering process at an encoder. The pixel classification step 510 is carried out to determine whether a pixel is an enhancement pixel or a restoration ratio based on context characteristics of the pixel to be filtered. In one embodiment, the boundary strength value (BS value) is used as the context characteristic. The pixel classification step 510 is performed by the pixel determining unit 110 to determine whether a pixel is an enhancement pixel or a restoration pixel. The unified loop filter formation step 520 is carried out for transforming a nonlinear image filtering portion into a nonlinear similarity-ordered statistics image filtering portion for filtering the reconstructed signal by the similarity transforming unit 120 and concatenating the nonlinear similarity-ordered statistics image filtering portion with a linear image filtering portion by the integrating unit 130 such that the reconstructed signal which is filtered by the linear image filtering portion is also filtered by the nonlinear similarity-ordered statistics image filtering portion. The filter coefficient estimation step 530 is carried out for optimizing the nonlinear similarity-ordered statistics image filtering portion and linear image filtering portion based on least mean square error algorithm to find the optimal unified loop filter coefficients by the signal quality optimizing unit 140. The filter tap selection step 540 is performed by the filter tap selecting unit 150. The filter tap lengths of each unified loop filter for the enhancement pixel and the restoration pixel are decided by, but not limited to, rate-distortion optimization selection within the whole frame.

$$J_{filter} = D + \lambda R \quad (9)$$

where D is the distortion between filtered frame and original frame, and R represents the bits for filter side information. The filter side information includes the filter tap type and filter coefficient quantization bits. The filter tap selection step 540 will pick a set of filter tap types and filter tap lengths for both the nonlinear similarity-ordered statistics image filtering portion 131 and the linear image filtering portion 132 at the same time. The distortion between the filtered frame and the original frame is measured. Various set of filter tap types and filter tap lengths are used for reiterating the unified loop filter step 520 and the filter coefficients estimation step 530 to obtain various distortion results. All the distortion results are compared with one another to determine which set of filter tap types and filter tap lengths provide the least distortion and will be used for filtering a frame.

The filter tap and coefficients coding step 550 is carried out by a filter information encoding unit 160 for encoding filter side information such as the filter tap type and the filter coefficient quantization bits and transmitting the same to the decoder side. The filter coefficients are encoded in two ways: temporal prediction coding with Exp-Golomb code and fixed length coding with 10 bits (one bit for sign and nine bits for magnitude).

Figure 6:
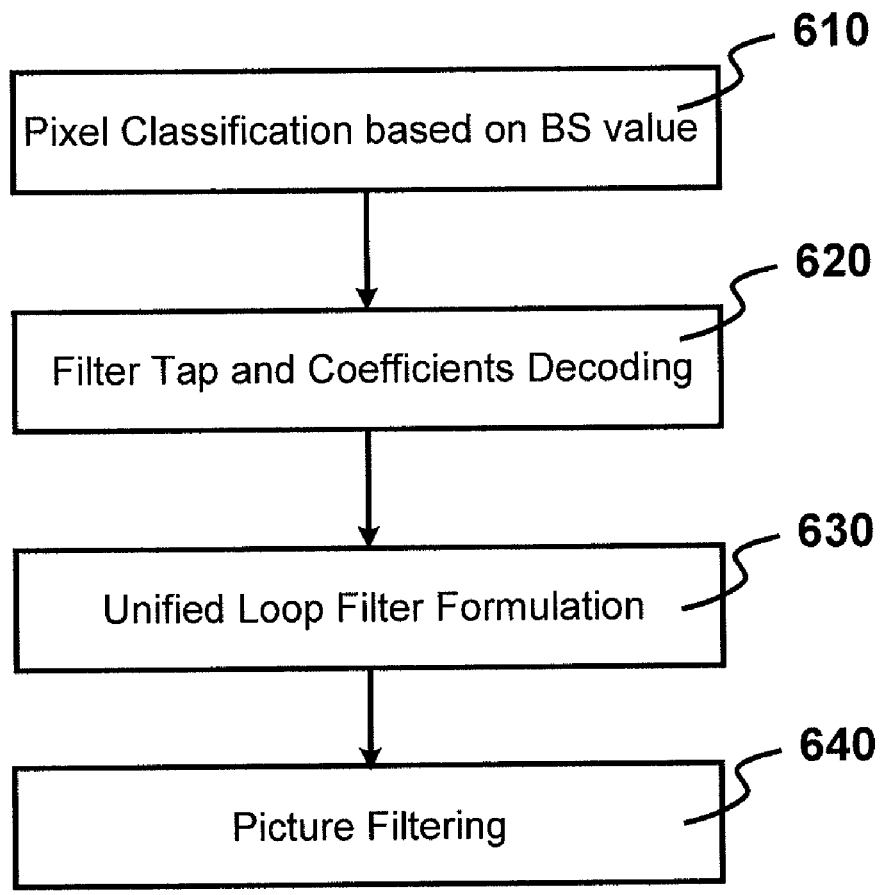
FIG. 6 shows a flowchart for a unified loop filtering process at a decoder.

FIG. 6 shows a flowchart for a unified loop filtering process at a decoder. A pixel classification step 610 is carried out for determining the type of a pixel based on context characteristics of the pixel to be filtered. In one embodiment, the boundary strength value (BS value) is used as the context characteristic. The pixel classification step 510 is performed by the pixel determining unit 110 to determine whether a pixel is an enhancement pixel or a restoration pixel. The filter tap and coefficient step 620 is performed by a filter information decoding unit (not shown) to provide the filter information such as the filter tap type, the filter tap length and the filter coefficient quantization bits for the unified loop filter formulation step 630

The unified loop filter formation step 630 transforms a nonlinear image filtering portion into a nonlinear similarity-ordered statistics image filtering portion for filtering the reconstructed signal by the similarity transforming unit 120 and concatenates the nonlinear similarity-ordered statistics image filtering portion with a linear image filtering portion using integrating unit 130 such that the reconstructed signal which is filtered by the linear image filtering portion is also filtered by the nonlinear similarity-ordered statistics image filtering portion.

A frame is filtered by the unified loop filter as formulated in the unified filter formulation step 630 in the picture filtering step 640.

Figure 7:
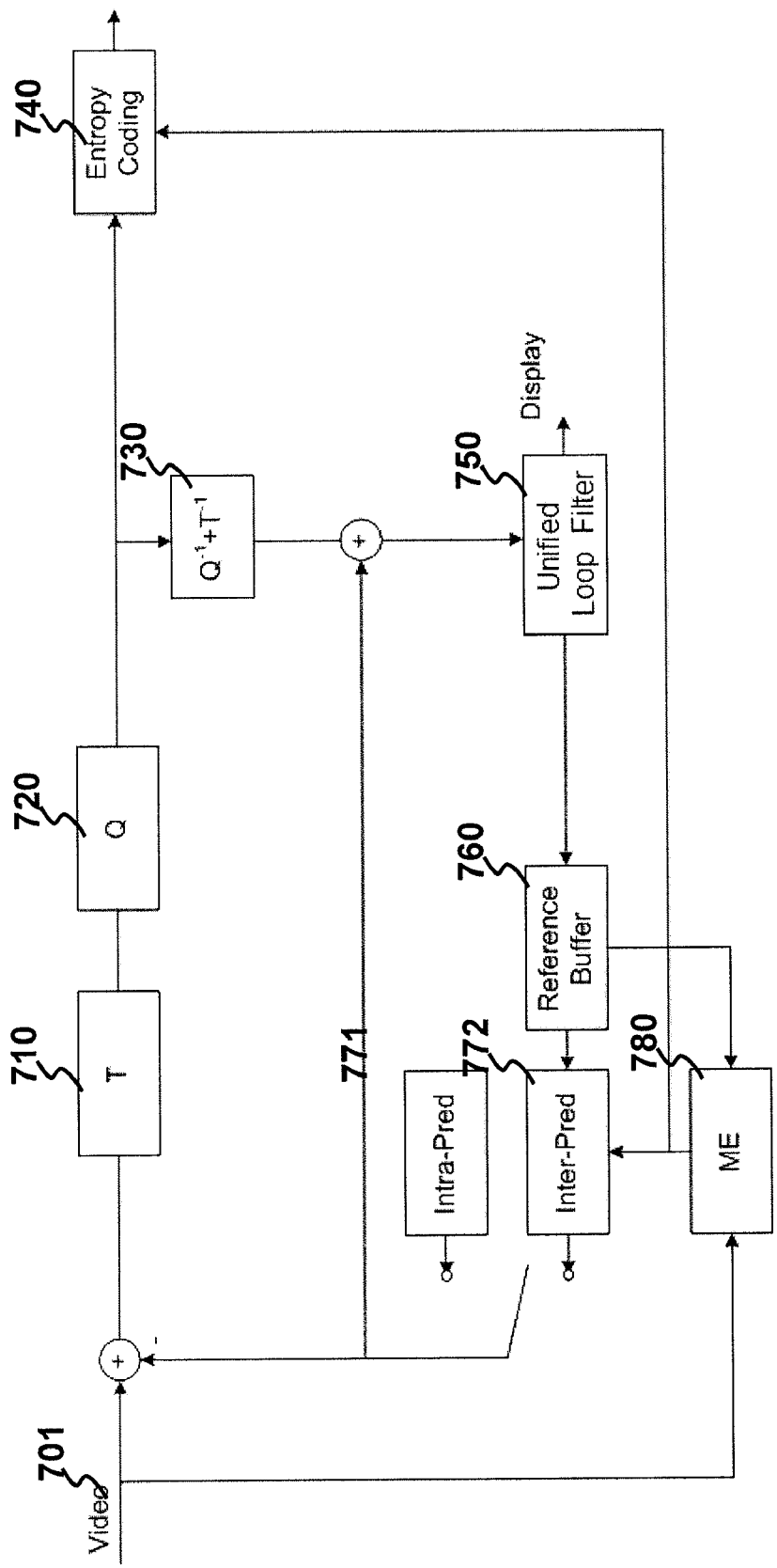
FIG. 7 shows a block diagram of an embodiment of a video coding system with a unified loop filter.

FIG. 7 shows a block diagram of an embodiment of a video coding system with a unified loop filter. The input of the video coding system is a video 701 and a residue image is obtained by subtracting a reference frame from a current frame. The residue image is transform 710 and quantized 720. After the transform and quantization, the residue image is retrieved by inverse transform and dequantization 730. The residue image is combined with the reference frame to obtain a reconstructed image. The reconstructed image is filtered by a unified loop filter 750 to provide a filtered image for display or stored in a reference buffer 760 as a reference image for intra-prediction 771 or for inter-prediction 772. The reference image is also used for motion estimation 780 together with the current frame from the video 701.

In general, the various embodiments of the unified loop filter can be implemented in various terminal equipment or user equipment including, but are not limited to, cellular telephones and other wireless communication devices, personal digital assistants (PDAs), portable and desktop computers, image/video devices such as digital cameras, audio-video (AV) equipment such as video players, gaming devices, Internet and local area network (LAN) devices which permit access and, optionally, browsing, as well as portable units or devices that incorporate combinations of such functions.

Embodiments of the present invention may be implemented in the form of software, hardware, application logic or a combination of software, hardware and application logic. The software, application logic and/or hardware may reside on integrated circuit chips, modules or memories. If desired, part of the software, hardware and/or application logic may reside on integrated circuit chips, part of the software, hardware and/or application logic may reside on modules, and part of the software, hardware and/or application logic may reside on memories. In an exemplary embodiment, the application logic, software or an instruction set is maintained on any one of various conventional computer-readable media. In the context of the present application, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

Optionally, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes exemplary embodiments of the invention, these descriptions should not be viewed in a limiting sense. Rather, there are several variations and modifications which may be made without departing from the scope of the present invention as defined in the appended claims.

What is claimed is:

1. A unified loop filter for video coding of an incoming signal, comprising:
   a pixel determining unit which determines the type of a pixel based on context characteristics of the pixel to be filtered;
   a similarity transforming unit which transforms a nonlinear image filtering portion into a nonlinear similarity-ordered statistics image filtering portion for filtering a reconstructed signal from an output of an encoder or a decoder; and
   an integrating unit which integrates the nonlinear similarity-ordered statistics image filtering portion generated by the similarity transforming unit with a linear image filtering portion such that the reconstructed signal which is filtered by the linear image filtering portion is also filtered by the nonlinear similarity-ordered statistics image filtering portion;

wherein the linear image filtering portion improves the objective quality of the reconstructed signal and the nonlinear similarity-ordered statistics image filtering portion improves the subjective quality of the reconstructed signal; and wherein the transforming of a nonlinear image filtering portion into a nonlinear similarity-ordered statistics image filtering portion comprises transforming $x_i$, a component in a first vector, into $x'_i$, a component in a second vector, by a relationship $$x'_i = [1 - f(x_c, x_i)] \cdot x_c + f(x_c, x_i) \cdot x_i$$

where $f(x_c, x_i)$ is a similarity function for comparing $x_i$ and a reference $x_c$.

2. The unified loop filter as claimed in claim 1, further comprising:
a signal quality optimizing unit which optimizes the nonlinear similarity-ordered statistics image filtering portion and linear image filtering portion based on least mean square error algorithm to find the optimal unified loop filter coefficients.

3. The unified loop filter as claimed in claim 1, further comprising:
a filter tap selecting unit which selects a filter tap for each of the linear image filtering portion and the nonlinear similarity-ordered statistics image filtering portion based on rate distortion optimization.

4. The unified loop filter as claimed in claim 1, further comprising:
a filter coefficient encoder which encodes the filter coefficients of the unified loop filter by a temporal prediction coding with Exp-Golomb code.

5. The unified loop filter as claimed in claim 1, further comprising:
a filter coefficient encoder which encodes the filter coefficients of the unified loop filter by a fixed length coding.

6. A unified loop filtering method for filtering a reconstructed signal, comprising:
determining a type of a pixel to be filtered based on context characteristics of the pixel;
transforming a nonlinear image filtering portion into a nonlinear similarity-ordered statistics image filtering portion for filtering the reconstructed signal; and
concatenating the nonlinear similarity-ordered statistics image filtering portion with a linear image filtering portion such that the reconstructed signal which is filtered by the linear image filtering portion is also filtered by the nonlinear similarity-ordered statistics image filtering portion;
wherein the linear image filtering portion improves the objective quality of the reconstructed signal and the nonlinear similarity-ordered statistics image filtering portion improves the subjective quality of the reconstructed signal; and
wherein the transforming of a nonlinear image filtering portion into a nonlinear similarity-ordered statistics image filtering portion comprises transforming $x_i$, a component in a first vector, into $x'_i$, a component in a second vector, by a relationship $$x'_i = [1 - f(x_c, x_i)] \cdot x_c + f(x_c, x_i) \cdot x_i$$

where $f(x_c, x_i)$ is a similarity function for comparing $x_i$ and a reference $x_c$.

7. The unified loop filtering method as claimed in claim 6, further comprising:
optimizing the nonlinear similarity-ordered statistics image filtering portion and linear image filtering portion based on a least mean square error algorithm to find optimal unified loop filter coefficients.

8. The unified loop filtering method as claimed in claim 7, further comprising:
selecting a filter tap for each of the linear image filtering portion and the nonlinear similarity-ordered statistics image filtering portion based on rate distortion optimization.

9. The unified loop filtering method as claimed in claim 7, further comprising:
encoding filter coefficients of the unified loop filter by a temporal prediction coding with Exp-Golomb code.

10. The unified loop filtering method as claimed in claim 7, further comprising:
encoding filter coefficients of the unified loop filter by a fixed length coding.

11. An encoder for encoding a digital video signal, comprising:
the unified loop filter as claimed in claim 1; and
a looping unit which reiterates a formulation of the unified loop filter using a plurality of filter tap types and filter lengths to perform rate distortion optimization selection.

12. A decoder for decoding a digital video signal, comprising:
the unified loop filter as claimed in claim 1; and
a decoding unit which decodes filter information for retrieving parameters for formulating the unified loop filter.

13. A system for video processing, comprising:
a first unit for performing transform and quantization on residue of a video signal obtained by subtracting a reference video signal from a current video signal;
a second unit for performing inverse transform and dequantization to obtain the residue video signal so that a reconstructed current video signal is formed by adding the residue video signal and the reference video signal; and
the unified loop filter as claimed in claim 1.

14. The unified loop filter as claimed in claim 1, wherein:
the transforming of a nonlinear image filtering portion into a nonlinear similarity-ordered statistics image filtering portion further comprises transforming an observation vector, $X = (x_1, x_2, \ldots, x_M)^T$, into a similarity statistics vector, $X' = (x'_1, x'_2, \ldots, x'_M)^T$, by the relationship for $i = 1, 2, \ldots, M$.

15. The unified loop filter as claimed in claim 14, wherein:
the similarity transforming unit further orders the components of the similarity statistics vector.

16. The unified loop filtering method as claimed in claim 6, wherein:
the transforming of a nonlinear image filtering portion into a nonlinear similarity-ordered statistics image filtering portion further comprises transforming an observation vector, $X = (x_1, x_2, \ldots, x_M)^T$, into a similarity statistics vector, $X' = (x'_1, x'_2, \ldots, x'_M)^T$, by the relationship for $i = 1, 2, \ldots, M$.

17. The unified loop filtering method as claimed in claim 16, further comprising:
ordering the components of the similarity statistics vector.

* * * * *